United States Patent [19]
Thomas

[11] Patent Number: 5,385,206
[45] Date of Patent: Jan. 31, 1995

[54] ITERATED FOAM PROCESS AND COMPOSITION FOR WELL TREATMENT

[75] Inventor: Todd R. Thomas, Coraopolis, Pa.

[73] Assignee: Clearwater, Inc., Pittsburgh, Pa.

[21] Appl. No.: 6,791

[22] Filed: Jan. 21, 1993

[51] Int. Cl.$^6$ .................. E21B 21/14; E21B 37/00; E21B 43/40

[52] U.S. Cl. .................. 166/269; 166/309; 166/312; 175/66; 175/69

[58] Field of Search .............. 166/267, 309, 311, 312; 175/66, 69, 71, 206

[56] References Cited

U.S. PATENT DOCUMENTS

| | | | |
|---|---|---|---|
| 3,076,508 | 2/1963 | Lissant. | |
| 3,130,798 | 4/1964 | Schramm et al. | 175/69 |
| 3,155,178 | 11/1964 | Kirkpatrick et al. | 175/69 |
| 3,229,777 | 1/1966 | Rogers et al. | 175/71 |
| 3,303,896 | 2/1967 | Tillotson et al. | 175/69 |
| 3,391,750 | 7/1968 | Zika | 175/71 |
| 3,572,440 | 3/1971 | Hutchison et al. | 166/311 |
| 3,610,340 | 10/1971 | Hutchison et al. | 175/69 X |
| 4,113,631 | 9/1978 | Thompson. | |
| 4,121,664 | 10/1978 | Fischer et al. | 175/66 X |
| 4,201,678 | 5/1980 | Pye et al.. | |
| 4,232,741 | 11/1980 | Richardson et al. | 166/281 |
| 4,461,716 | 7/1984 | Barbarin et al. | 175/71 X |
| 4,681,164 | 7/1987 | Stacks | 166/312 X |
| 4,796,702 | 1/1989 | Scherubel | 166/308 |
| 5,215,596 | 7/1993 | Van Slyke | 175/206 X |
| 5,279,367 | 1/1944 | Osterloh | 166/309 X |

*Primary Examiner*—George A. Suchfield
*Attorney, Agent, or Firm*—William L. Krayer

[57] ABSTRACT

In the removal of particulates from a wellbore, such as in air drilling for hydrocarbon recovery, a mixture of an amphoteric foaming agent and, typically, an anionic surfactant is employed. An aqueous solution thereof having a pH of at least 9.5 is used to generate a foam for removing the particulates; then the foam is collapsed by the introduction of acid to reduce the pH below about 4, the particles are removed mechanically, the pH is restored to greater than 9.5, and the foaming solution is returned to the wellbore. The solution may be used several times; partial losses of foaming agent in the process may be easily replenished with each cycle. Cationic surfactants may be used instead of anionic, with foaming and foam collapse being controlled at opposite pH's. Savings are realized in water, drilling chemicals, and settling pits and the like for removing particulates from the foam.

22 Claims, No Drawings

ITERATED FOAM PROCESS AND COMPOSITION FOR WELL TREATMENT

TECHNICAL FIELD

This invention relates to well drilling for hydrocarbon recovery, and to the use of foam in well cleaning, and especially to the use of foam for the removal of particulate debris from wells through the use of foam. It is particularly useful for removing drilled material (cuttings) from the wellbore using foam, in the process sometimes known as air foam drilling. It provides a method and composition which enable the recycling of foaming compositions in air foam drilling and well cleaning with foams, resulting in savings of foaming agents, at the same time making unnecessary (or at least minimizing the necessity for) the settling ponds and basins used previously to dispose of the foam and foaming agents.

BACKGROUND OF THE INVENTION

It is well known to use foam to assist in the removal of cuttings from wellbores during drilling in hydrocarbon recovery from subterranean formations. See Schramm and Gustafson, U.S. Pat. No. 3,130,798 and Elman, Woodward and Sullivan, U.S. Pat. No. 3,297,098. Foam may also be used as a workover fluid in cleaning debris from existing oil and gas wells. The foam is typically generated by the use of surfactants of various kinds together with the injection down the wellbore of air (or another gas such as nitrogen, $CO_2$ or methane) under pressure. Responding to the agitation and pressure of the gas during drilling, the foam lifts the cuttings and/or other particulate debris up through the wellbore; the foam and the cuttings must then be separated mechanically and/or the foam/particulate mixture must be sent to a settling pond or basin, creating either an environmental problem or requiring an expensive vessel to contain the foam/particulate mixture, or both. An average drilling operation may generate one thousand cubic feet of foam per minute as it expands in the relatively low pressure of the wellhead. The presence of foam makes the job of the mechanical separator difficult; separators designed to handle large quantities of foam tend to be large and expensive, and also tend to require significant amounts of attention. Settling ponds must be lined to prevent seepage into the earth and their use is in any event environmentally undesirable; for example, the wind may blow the foam out of the ponds, carrying various chemicals with it. Accordingly, while foaming techniques for drilling employ less water than conventional mud drilling, there is a need to employ foam in a way which reduces the amount of water used, and the volume of foam, and which ameliorates the difficulties of disposal.

Materials which generate foam in water are known as surfactants, meaning that they have a tendency to migrate to the surface. The migration is caused by the fact that a portion of the surfactant molecule is hydrophobic. The other, hydrophilic, portion of the materials imparts the water-soluble character of the material. Foams are generated under mechanical agitation; their physical form represents stored mechanical energy. Without mechanical agitation, a surfactant will not form a foam. Individual foam bubbles initially tend to assume a spherical configuration, but, over time, the water and the surfactant will drain by gravity through the foam structure, thinning and weakening it; during this process the foam bubbles may change shape. It is characteristic of all foams subject to gravity that they will tend to collapse or dissipate, although some are of course more stable than others.

Zika, in U.S. Pat. No. 3,391,750, reports on studies of the effects on foam volume and foam half-life in a two-component system caused by variations in salinity of the medium, the presence of different cations in the surfactants, the optimum ethylenoxy content in his system, the number of carbons in his alkyl groups, and the extent of branching in his octyl groups. Similar surfactants are described by Kirkpatrick et al in U.S. Pat. Nos. 3,215,200 and 3,155,178. See also Rogers U.S. Pat. No. 3,229,777, describing a number of effective foam formers; also Lissant U.S. Pat. No. 3,076,508.

Prior to the present invention it has been known to use amphoterics such as amine oxides in foaming agents. See Tillotson and James U.S. Pat. No. 3,303,896. Thompson, in U.S. Pat. No. 4,113,631, has suggested the use of certain quaternary ammonium chlorides in combination with certain amine oxides as foaming and silt suspending agents in the treatment of subterranean formations for hydrocarbon recovery. He presents data to show the foam height and half-life of various combinations within his class of surfactants, and, interestingly, in the presence of 3% or 15% hydrochloric acid. Pye et al in U.S. Pat. No. 4,201,678 use a foaming agent comprising an amphoteric betaine, an anionic surfactant, and unneutralized ammonia to maintain a high pH in order to inhibit corrosion.

I am not aware of a system in the prior art such as mine, employing an amphoteric surfactant, in combination with an anionic or cationic surfactant, in more than one cycle, wherein pH is used to control the collapse and reformation of the foam; nor am I aware of the use of such a system for recycling of the foam; nor am I aware of such a system in which the foam may be recycled at the wellhead by alternate acid and caustic, or caustic and acid, treatment.

SUMMARY OF THE INVENTION

I have found that certain amphoteric foam-generating agents, when used in combination with either an anionic surfactant or a cationic surfactant, can be used over and over again for cleaning of existing wells and/or in foam drilling for hydrocarbon recovery by changing the acidity and/or basicity of the system to enhance or collapse the foam action. Where an anionic surfactant is used, for example, in combination with the amphoteric, a highly caustic solution will foam, but converting it to highly acidic will change the charge on the amphoteric surfactant, causing an incompatibility with the anionic surfactant, essentially temporarily destroying its surfactant abilities, and resulting in a complete loss of foam. Using amphoteric materials in combination with anionic surfactants, foam will be produced when the pH is at least about 9.5, and will be suppressed or destroyed when it is reduced to about 4 or less. Where a cationic surfactant is used in combination with the amphoteric according to my invention, the opposite is true—a foam which is stable at a low pH will collapse at a high one. Thus my invention provides for recycling of the foam generating compositions by injecting them into the wellbore with caustic and/or otherwise in a solution of pH about 9.5 or higher and with air (or nitrogen, $CO_2$, methane, or other gas as is known in the art) under pressure, thereby generating foam under agitation at the bottom of the wellbore, lifting cuttings and other particulate material with the foam which is caused to rise in the borehole, treating the foam with acid when it arrives at the top of the well or after a batch of it is collected in a relatively small receptacle, to reduce the pH to about 4 or less, whereby the foam is collapsed, separating the cuttings and/or other particulates from the resulting liquid to obtain again a solution of foaming material, adding caustic to the solution, adding more amphoteric material if necessary and also anionic surfactant if it is depleted, and re-injecting the solution into the wellbore, where it is able to form foam again under the agitation of the gas at the bottom of the well. This process may be repeated two, three, four or more times. About 0.5% to about 5% based on the total surfactant, preferably about 1–3%, of a fatty acid or salt thereof may be added. A similar process may be followed using compositions comprising amphoteric and cationic surfactants, wherein the foam is generated at low pH and is collapsed at a high pH.

DETAILED DESCRIPTION OF THE INVENTION

I may use any combination of foaming agents which will generate foam at a desired pH and not at a different pH. That is, my invention involves the use of any combination of surfactants which will alternately form a foam and collapse it as caustic and acid (or acid and caustic) are alternately introduced into the system. The surfactants and amphoteric foaming agents which are described in any of the patents mentioned in the Background of the Invention are potentially useful in my invention, and the entire descriptive matter of said patents is incorporated herein by reference.

A typical composition which will generate foam at a pH above about 9.5, and collapse if the pH is reduced to about 4 or less, may be seen as comprising two components—(1) an anionic component which may be made up of quite conventional anionic surfactants such as linear alcohol ether sulfates, alpha olefin sulfonates, and alkyl aromatic sulfonates or blends thereof and (2) one or more amphoteric foamers. In my preferred systems, I may employ component (1) and component (2) in concentrations such as to provide a final molar ratio of anionic surfactants to amphoterics of about 0.6:1 to about 1.4:1. Such a combination of components will create a foam under proper agitation at a pH above about 9.5, will begin to collapse around pH 7 and should be completely collapsed at pH 3, preferably at about 4. During foaming, the anionic surfactant and the amphoteric surfactant complement one another. During collapse, the ionic interaction between the two reduces their surfactant properties and forms an anionic/cationic conglomerate that will not foam in spite of agitation.

For air foam drilling, my two-component foaming composition should be used in concentrations of about 0.2% to about 2.0%, and preferably about 0.4% to about 0.7% by weight based on the solution without considering the weight of the particulates. Any of the anionic foamers (surfactants) known in the art to be useful as foaming agents in well cleanup or air drilling may be used in my process. See the examples described in the above cited Rogers, Tillotson, and Lissant patents, for example. Conversely, I may employ cationic surfactants which will foam in combination with amphoterics at pH's below about 3.5 and which will collapse at about pH 9.5. When employing such combinations of materials, I use caustic materials to collapse the foam, and add acid to cause the foam to form again.

I have found that several iterations of the foam cycle may be employed without losing the efficiency of the process, although, since some of the surfactant is necessarily left with the solids removed at the wellhead, replenishment to at least some extent is usually necessary with each iteration. I have found that, if one is to continue the use of a composition similar to the one used in the beginning of the process, the solution used for replenishing the surfactants with each cycle should have a molar ratio of anionic to amphoteric of about the same, preferably 0.6:1 to about 1.4:1.

I prefer to use sulfuric acid to kill the foam in an anionic system, particularly where the well treatment fluid will contact limestone in the formation. Hydrochloric or other acids may be used for pH adjustment but the calcium sulfate generated by the sulfuric acid is more convenient way to remove calcium from the system. Calcium may also be preferentially removed by clarifying the water by the well-known lime soda technique.

As amphoterics, any of the amine oxides described by Tillotson in the above-mentioned U.S. Pat. No. 3,303,896, is suitable, i.e. amine oxides of the general formula $R^2R^2R^3NO$ wherein $R^1$ is an alkyl chain containing at least about 10 carbon atoms and $R^2$ and $R^3$ are lower alkyl groups or lower hydroxyalkyl groups; see also the descriptions of amine oxide foamers in Thompson U.S. Pat. No. 4,108,782. Also, various carboxylated imidazoline derivatives, sulfonated imidazoline derivatives, betaines and sultaines, and aminopropionates may be used as amphoterics in my invention. Generally, the amphoteric materials useful in my invention to make foam at high pH's will have a tertiary amine group and either a carboxylate of a sulfonate group. The carboxylated and sulfonated imidazoline derivatives behave as anionic surfactants at high pH ranges; the betaines and sultaines are zwitterionic. Typical carboxylated imidazoline derivatives of utility in my invention may be based on a product made by condensing a fatty acid (preferably of six to 25 carbon atoms) with an aminoalkylolamine (such as $HOCH_2CH_2NHCH_2CH_2NH_2$) to produce an imidazoline substituted at the 1 and 2 positions:

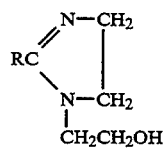

This material is a cationic surfactant which may be further reacted to produce amphoteric materials. An example of the type of amphoteric surfactant which can be made from the above illustrated type of compound is the alkoamphoglycinate

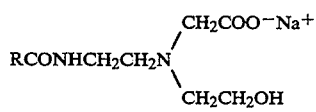

Such materials may be considered derivatives of glycine and also may be dicarboxylated:

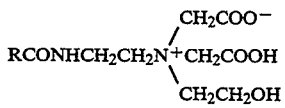

If a carboxyethyl group is used instead of a carboxymethyl group, the compound may be described as n alkoamphopropionate:

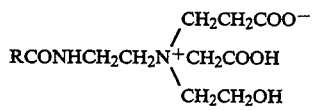

The sulfonated imidazoline derivatives may be typified by an alkoamphopropylsulfonate:

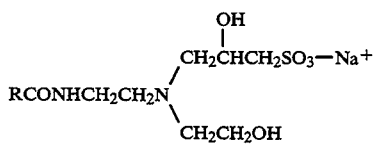

Trimethyl glycine, or betaine, is also commonly used to make amphoterics, by substituting one of the methyl groups with a fatty chain, here designated by R:

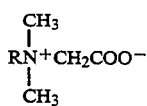

Again, the fatty chain (designated by R in any of the compounds illustrated herein) may have from about 6 to about 25 carbon atoms. Such materials are commonly referred to as N-alkyl betaines. One or both of the remaining methyl groups may be replaced by hydroxyethyl groups to make, for example, a dihydroxyethyl alkyl glycinate, which is quite useful in my invention, having the structural formula

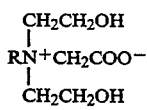

Similar materials derived from N-alkanoylamidopropylamines may be exemplified by an alkamidopropyl betaine:

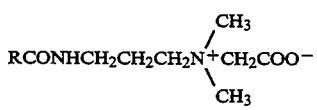

And, hydroxysulfonate groups may be used in place of the carboxylic group, to form alkamidopropyl hydroxysulatines:

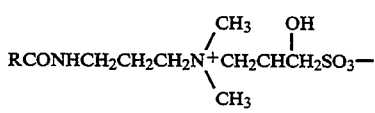

Aminopropionates are also useful in my invention. At a neutral pH, these materials are zwitterionic:

At alkaline pH, they may be depicted as anionic:
$RNHCH_2CH_2COO^-Na^+$

At acid pH, they are cationic:
$RNH_2^+CH_2CH_2COOH$

The alkylaminodipropionates are as follows:

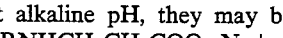

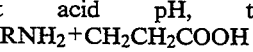

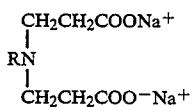

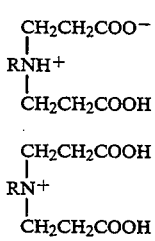

As mentioned previously, I may use any combination of surfactants which will generate foam at either a high or a low pH, which will collapse at the opposite pH. In particular, I use any combination of an amphoteric surfactant and another surfactant which will generate a foam at one pH and collapse at another. Persons skilled in the art will appreciate that there may be numerous such combinations which will perform with varying degrees of efficiency under the circumstances encountered in the field. I intend to include within my invention combinations whose foam formation and collapse can be controlled by alterations in pH regardless of their possible inferiority, from the standpoint of the most desirable economic result, in a given wellbore.

I have performed a number of laboratory experiments to demonstrate the effect of pH, and changes in pH, on the formation of foam and its collapse. A relatively simple approach, used to generate the data below, was as follows. First, 100 ml of the test water to be used (sometimes brine, hard water, or softened water, for example), at a predetermined pH, is measured and the surfactant (usually about 0.5 ml) and/or other material is added. The mixture is placed in a variable speed Waring blender and mixed at a low speed for about 30 seconds if the test material is a liquid; about one minute if it is a solid. The sample, with the foam generated, is then poured into a 1000 ml cylinder, and the height of the foam is measured immediately. The foam will begin to collapse, either rapidly or slowly, with the absence of agitation. A record is made of the time from cessation of the blender to the point at which the lower, drained liquid, portion of the sample reaches 50 ml; this is noted as the "half-life" of the foam, and is used as a measure of the collapse or drainage time, of the foam.

In the tests to follow, the surfactants used are:
101 a blend of anionic surfactants 201, 203, and 204 in a ratio of about 3:1:1.
102 a blend of anionic surfactants 202, 203, and 204 in a ratio of about 3:1:1.
103 Coco ampho carboxy propionic acid
104 Coco dimethyl amine oxide, 30% active
105 Coco amido propyl sulfo betaine 106 Coco amido propyl betaine
107 coco amido propyl amine oxide
108 tallow bis-hydroxyethyl glycinate
109 coco diethanol amide
110 oleic acid diethanolamine
111 coco N,N-bis-(hydroxyethyl) amide
112 acrylic acid/dimethyldiallyl ammonium chloride copolymer
113 coco trimethyl ammonium chloride
114 ethoxylated coco amine
115 cationic surfactant blend
115 lauramine oxide
117 dihydroxyethyl C12-C15 alkoxypropyl amine oxide
118 coco amido propyl amine oxide
201 C9-C11 linear alcohol alkoxy sulfate (60%)
202 C6-C10 linear alcohol ethoxy sulfate (80%)
203 tri-ethylene glycol mono hexyl ether sulfate
204 C14-C16 alpha olefin sulfonate
205 coco dimethyl amine oxide, distilled (40%)
206 ethylene diamine tetraacetic acid, trisodium salt (EDTA)
207 oleic acid
301 dodecanoic acid
302 coco acid
303 octodecanoic acid
304 lauric acid
305 myristic acid
306 octodecanoic acid
307 hexadecanoic acid
308 octanoic acid
309 oleic acid, 90%
310 oleic acid, 94%
401 coco ampho acetate
402 coco ampho propionate
403 coco ampho hydroxypropyl sulfonate
404 lauro ampho acetate
405 lauro ampho dipropionate
406 capryl ampho diacetate
407 sodium lauriminopropionate
408 disodium tallow iminodipropionate
409 stearo ampho propyl sulfonate From the data in Table I, it was found that alkali metal salts of fatty acids are not alone sufficient in both foam formation and stability under varying conditions at the desired pH. The objective was to identify foaming materials demonstrating, at 0.5%, a foam height of at least about 450 ml in fresh water and at least about 250 ml in brine, and a half life (stability) of better than 3:30 in fresh water and 2:00 in brine. In this series of tests, the water was softened with EDTA and adjusted to pH 11. 0.2% percent portions of the test materials were used.

TABLE I

| Material | Fresh Water | | Brine | |
| --- | --- | --- | --- | --- |
| | height | half life | height | half life |
| 301 | 340 | 3:15 | 100 | 0 |
| 302 | 120 | 0:20 | 140 | 0:33 |
| 303 | 220 | 1:00 | 100 | 0 |
| 304 | 130 | 0:20 | 100 | 0 |
| 305 | 100 | 0 | 100 | 0 |
| 306 | 150 | 0 | 100 | 0 |
| 307 | 290 | 4:30 | 100 | 0 |
| 308 | 100 | 0 | 100 | 0 |
| 309 | 280 | 2:00 | 150 | 0 |
| 310 | 230 | 0:47 | 110 | 0 |

The purpose of the experiments reported in Table II was to determine the effect on the performance of a typical alkali metal fatty acid salt of varying concentrations of EDTA on a hard water (0.1% calcium chloride). The results show that foam height is improved through the addition of an efficient chelating agent, but the foam half life is not acceptable for such combinations alone. The foam height and half life are reported together, e.g. 123/1:23. I have determined that fatty acid salts are helpful in aiding the collapse of foam as the pH is lowered through 7 to 4.

TABLE II

| % #206 | #310 (0.2%) | #304 (0.2%) |
| --- | --- | --- |
| 0.025 | 130/0 | 130/0 |
| 0.05 | 140/0 | 150/0 |
| 0.075 | 140/0 | 200/0:16 |
| 0.10 | 150/0 | 270/1:09 |
| 0.125 | 170/0:23 | 430/3:36 |
| 0.15 | 320/1:40 | 480/3:41 |
| 0.175 | 380/2:58 | 510/3:52 |
| 0.2 | 390/3:12 | 530/4:01 |
| 0.225 | 410/2:56 | 520/4:12 |
| 0.250 | 410/2:53 | 500/4:10 |
| 0.275 | — | 480/3:47 |

The Table III experiments were designed to learn the combined effect of pH on mixtures of a base or test anionic surfactant and various other surfactants. In Table III, all of the materials listed in the first column were used in a solution containing 0.2% #101. The listed material was also employed at 0.2%. The first two columns of test data represent the results at pH 3 and with the same solution after adjustment to pH 11; the third column is a comparison of a similar solution not having been treated or tested at pH 3. The same type of comparison was made for brine (13% sodium chloride solution) at pH 3 and 11.

TABLE III

| Material | Fresh Water | | | Brine | | |
| --- | --- | --- | --- | --- | --- | --- |
| | pH 3 | pH 11 | pH 11 | pH 3 | pH 11 | pH 11 |
| — | 330/2:32 | 310/1:55 | 360/2:16 | 260/1:21 | 260/1:08 | 280/1:19 |
| 103 | 320/2:24 | 320/2:17 | 320/3:23 | 280/1:30 | 250/1:09 | 280/1:34 |
| 104 | 180/0 | 410/2:55 | 400/3:21 | 240/0:48 | 270/1:23 | 270/1:25 |
| 105 | 330/2:42 | 450/3:27 | 400/2:58 | 290/1:30 | 280/1:51 | 290/1:50 |
| 106 | 330/2:31 | 380/2:58 | 400/3:02 | 280/1:46 | 270/1:45 | 300/1:54 |
| 107 | 180/0 | 490/2:50 | 440/3:39 | 180/0:31 | 290/1:50 | 300/1:41 |
| 108 | 240/1:20 | 250/1:08 | 290/1:52 | 160/0 | 160/0 | 180/0 |
| 109 | 320/2:07 | 330/2:12 | 300/2:02 | 180/0 | 170/0 | 170/0 |
| 110 | 270/1:46 | 230/1:12 | 250/1:32 | 180/0 | 180/0 | 170/0 |
| 111 | 350/2:34 | 270/1:41 | 350/2:38 | 170/0 | 170/0 | 180/0 |
| 112 | 330/1:30 | 380/2:13 | 330/2:11 | 280/1:21 | 260/1:10 | 290/1:20 |
| 113 | 240/0:34 | 220/0:28 | 220/0:40 | 240/0:49 | 230/0:29 | 240/0:46 |
| 114 | 320/2:20 | 290/1:25 | 290/1:48 | 280/1:36 | 250/1:26 | 270/1:07 |

TABLE III-continued

| Material | Fresh Water | | | Brine | | |
| --- | --- | --- | --- | --- | --- | --- |
| | pH 3 | pH 11 | pH 11 | pH 3 | pH 11 | pH 11 |
| 115 | 220/0 | 180/0 | 240/0 | 210/1:01 | 210/0:32 | 250/0:55 |

Table IV presents results of a series of experiments similar to those of Table III except that surfactant #102 was used as the base material instead of #101.

TABLE IV

| Material | Fresh Water | | | Brine | | |
| --- | --- | --- | --- | --- | --- | --- |
| | pH 3 | pH 11 | pH 11 | pH 3 | pH 11 | pH 11 |
| — | 340/2:28 | 300/1:25 | 300/2:05 | 300/1:41 | 270/1:37 | 280/1:28 |
| 103 | 340/2:20 | 300/2:05 | 330/2:42 | 330/1:55 | 250/1:28 | 300/1:38 |
| 104 | 170/0 | 450/3:10 | 440/3:42 | 270/0:59 | 300/1:48 | 310/1:53 |
| 105 | 390/3:37 | 500/3:54 | 460/4:01 | 390/3:11 | 360/4:02 | 340/2:07 |
| 106 | 390/3:10 | 450/3:51 | 410/3:27 | 320/2:06 | 310/2:32 | 320/2:24 |
| 107 | 180/0 | 550/3:55 | 500/4:14 | 310/1:50 | 330/2:54 | 330/2:10 |
| 108 | 220/1:24 | 240/0:54 | 270/1:42 | 160/0 | 180/0:20 | 180/0:22 |
| 109 | 360/2:07 | 280/1:45 | 390/2:39 | 200/0:33 | 160/0 | 160/0 |
| 110 | 290/1:48 | 200/1:03 | 340/2:04 | 190/0:25 | 150/0 | 160/0 |
| 111 | 370/2:37 | 280/1:53 | 400/3:05 | 170/0 | 170/0 | 170/0 |
| 112 | 250/0:34 | 350/1:39 | 320/1:54 | 300/1:35 | 260/1:30 | 320/1:29 |
| 113 | 230/0:58 | 230/0:59 | 200/0:59 | 200/0:28 | 190/0:23 | 220/0:26 |
| 114 | 180/0 | 520/3:49 | 300/1:56 | 270/1:22 | 240/1:11 | 260/1:11 |
| 115 | 220/0 | 180/0 | 240/0:45 | 230/0:51 | 220/0.35 | 260/0:59 |

In Table V, the results of screening various amphoterics in combination with a particular "standard" anionic surfactant (#102) to record the foam height at pH3 and time of collapse of the foam, also at pH3. The first test listed was a control with no amphoteric, in which the 102 material was employed at 0.4%; otherwise, each of the tests had a 102 content of 0.2% and a test material content also of 0.2%. None of the combinations would be recommended for commercial use unless conditions are known to be different from those of the laboratory tests.

TABLE V

| Test Material | Fresh Water | Brine |
| --- | --- | --- |
| — | 480/4:00 | 380/2:29 |
| 401 | 350/3:06 | 260/0:55 |
| 402 | 320/2:09 | 290/1:45 |
| 403 | 300/2:41 | 330/1:50 |
| 404 | 340/2:45 | 230/0:35 |
| 405 | 370/2:58 | 310/1:57 |
| 406 | 320/2:15 | 290/1:39 |
| 407 | 350/3:03 | 280/1:08 |
| 408 | 280/2:32 | 280/1:13 |
| 409 | 370/2:35 | 300/1:18 |

Bearing in mind that the desirable criteria for the usual application of my process are good foam height and stability at pH11, under varying salinity conditions, together with a quick collapse of the foam at pH 4 or below, and weighting the latter as more important, I selected 104 and 107 as the better performing materials in combination with the "base" materials 101 and 102. These materials, 104 and 107, were tested in combination with material 102 in various ratios; the results are presented in Table VI. The brine was at the 13% level.

TABLE VI

| | | Fresh Water | | Brine | |
| --- | --- | --- | --- | --- | --- |
| 102% | 104% | pH 3 | pH 11 | pH 3 | pH 11 |
| 0.5 | 0 | 550/5:37 | 550/5:34 | 520/4:40 | 510/4:46 |
| 0.4 | 0.1 | 480/4:46 | 560/5:01 | 420/3:30 | 500/4:22 |

TABLE VI-continued

| | | Fresh Water | | Brine | |
| --- | --- | --- | --- | --- | --- |
| | | pH 3 | pH 11 | pH 3 | pH 11 |
| 0.3 | 0.2 | 330/2:00 | 510/4:43 | 330/1:54 | 460/4:02 |
| 0.2 | 0.3 | 180/0 | 450/3:57 | 260/0:39 | 430/3:49 |
| 0.1 | 0.4 | 240/1:11 | 410/3:24 | 290/1:21 | 290/2:44 |
| 0 | 0.5 | 350/2:24 | 340/1:24 | 330/1:58 | 320/2:12 |
| 102% | 107% | | | | |
| 0.5 | 0 | 550/5:36 | 550/5:35 | 520/4:42 | 510/4:46 |
| 0.4 | 0.1 | 360/2:57 | 560/5:27 | 470/3:54 | 500/4:22 |
| 0.3 | 0.2 | 280/1:50 | 520/4:46 | 370/2:40 | 460/4:02 |
| 0.2 | 0.3 | 210/0:00 | 480/4:17 | 240/1:02 | 430/3:49 |
| 0.1 | 0.4 | 300/2:31 | 390/2:59 | 280/1:59 | 290/2:44 |
| 0 | 0.5 | 350/2:22 | 320/2:14 | 320/2:33 | 300/2:12 |

Generally, I prefer combinations which, at 0.5%, have a foam height in fresh water at pH11 of at least 450 with a half life of at least 3:30 and in brine at pH11 of at least 300 and 2:30 respectively; at pH3, they should have a foam height no greater than 200 in fresh water and 250 in brine, with a half life of less than 1:00 in each case. Such results are not always achievable and/or predictable, however, under field conditions, but generally satisfactory (not necessarily ideal) results may be obtained using molar ratios of amphoteric to anionic (where foam is desired at a high pH) of from about 0.6:1 to about 1.4:1; more preferably, the molar ratio should be about 0.9 to 1 to about 1.1 to 1. In Table VII, a particular amphoteric, #205, is used in various combinations and ratios with four different anionics, all in hard water (calcium chloride at 0.1%).

TABLE VII

| 201, % | 202, % | 203, % | 204, % | 205, % | pH 3 | pH 11 |
| --- | --- | --- | --- | --- | --- | --- |
| 0.5 | — | — | — | — | 600/4:41 | 590/4:38 |
| — | 0.5 | — | — | — | 560/4:42 | 540/4:45 |
| — | — | 0.5 | — | — | 300/1:23 | 270/1:29 |
| — | — | — | 0.5 | — | 350/2:18 | 380/2:12 |
| — | — | — | — | 0.5 | 450/2:30 | 460/2:50 |
| 0.3 | — | — | — | 0.2 | 420/0:20 | 540/4:27 |
| — | 0.3 | — | — | 0.2 | 500/0:20 | 560/4:30 |
| — | — | 0.3 | — | 0.2 | 250/0:19 | 530/4:20 |
| — | — | — | 0.3 | 0.2 | 180/0:10 | 310/3:07 |
| 0.2 | — | — | — | 0.3 | 210/0:50 | 500/4:15 |
| — | 0.2 | — | — | 0.3 | 180/0:11 | 500/3:47 |
| — | — | 0.2 | — | 0.3 | 290/1:29 | 550/4:00 |
| — | — | — | 0.2 | 0.3 | 250/1:05 | 370/2:28 |
| 0.1 | — | — | — | 0.4 | 420/2:31 | 460/3:24 |

TABLE VII-continued

| 201, % | 202, % | 203, % | 204, % | 205, % | pH 3 | pH 11 |
|---|---|---|---|---|---|---|
| — | 0.1 | — | — | 0.4 | 340/1:49 | 500/3:54 |
| — | — | 0.1 | — | 0.4 | 390/1:45 | 500/3:56 |
| — | — | — | 0.1 | 0.4 | 400/1:50 | 390/2:55 |
| 0.4 | — | — | — | 0.1 | 380/2:00 | 600/4:43 |
| — | 0.4 | — | — | 0.1 | 410/2:00 | 580/5:17 |
| — | — | 0.4 | — | 0.1 | 160/0 | 450/3:17 |
| — | — | — | 0.4 | 0.1 | 300/1:22 | 330/3:44 |
| — | 0.25 | — | — | 0.25 | 170/0 | 490/4:00 |
| — | 0.2 | — | 0.1 | 0.2 | 180/0:40 | 510/4:26 |
| — | 0.15 | 0.05 | 0.05 | 0.25 | 160/0 | 530/4:26 |

Based on the above various results, the following formulations were designed:

| Formula | Components | % by Weight |
|---|---|---|
| 50 | 102 | 55 |
|  | 104 | 40 |
|  | ethylene glycol monobutyl ether | 5 |
| 60 | 202 | 8.33 |
|  | 203 | 2.78 |
|  | 204 | 2.78 |
|  | 205 | 13.89 |
|  | 207 | 11.11 |
|  | 206 | 5.50 |
|  | KOH solution (45%) | 0.06 |
|  | water | 45.55 |
|  | isopropyl alcohol | 10.0 |
| 70 | 309 | 10 |
|  | 304 | 15 |
|  | EDTA solution (40%) | 15 |
|  | isopropanol | 15 |
|  | KOH solution (45%) | 11 |
|  | water | 34 |
| 75 | 202 | 15 |
|  | 204 | 5 |
|  | 203 | 5 |
|  | 205 | 25 |
|  | isopropanol | 10 |
|  | water | 40 |
| 80 | 206 | 20 |
|  | 70 | 50 |
|  | 75 | 30 |
| 85 | 202 | 3 |
|  | 204 | 1 |
|  | 203 | 1 |
|  | 205 | 5 |
|  | 207 | 6 |
|  | 304 | 9 |
|  | KOH solution (45%) | 7 |
|  | 206 | 25 |
|  | isopropanol | 12 |
|  | water | 31 |
| 90 | 205 | 25 |
|  | 203 | 5 |
|  | 202 | 15 |
|  | 204 | 5 |
|  | 304 | 2 |
|  | isopropyl alcohol | 10 |
|  | water | 38 |
| 95 | 202 | 12 |
|  | 204 | 4 |
|  | 203 | 4 |
|  | 205 | 20 |
|  | 310 | 4 |
|  | 304 | 6 |
|  | KOH solution (45%) | 4.7 |
|  | 206 | 15 |
|  | isopropanol alcohol | 10 |
|  | water | 20.3 |

Additional tests were run using 0.5% of various formulations to obtain results in fresh water, 50/50 brine, and deionized water, with results shown in Table VIII:

TABLE VIII

| Formula | pH 3 | pH 11 | pH 3 | pH 11 |
|---|---|---|---|---|
|  | Fresh Water |  | 50/50 Brine |  |
| 50 | 180/0 | 540/5:28 | 210/0:22 | 370/2:41 |
| 60 | 140/0 | 200/0:28 | 150/0 | 190/0:25 |
| 70 | 220/1:08 | 310/2:20 | 100/0 | 100/0 |
| 75 | 160/0 | 410/4:34 | 240/1:05 | 350/2:33 |
| 80 | 330/2:20 | 450/4:25 | 160/0 | 170/0 |
| 85 | 300/2:07 | 450/4:53 | 150/0 | 140/0 |
| 90 | 160/0 | 270/2:04 | 240/0:49 | 280/1:27 |
|  | Deionized Water |  | Hard Water |  |
| 50 | 160/0 | 510/5:09 | 180/0 | 500/4:55 |
| 60 | 150/0 | 260/1:45 | 160/0 | 180/0 |
| 70 | 100/0 | 510/5:58 | 100/0 | 100/0 |
| 75 | 150/0 | 470/4:53 | 120/0 | 450/4:38 |
| 80 | 100/0 | 530/5:28 | 160/0 | 190/0 |
| 85 | 100/0 | 530/543 | 100/0 | 120/0 |
| 90 | 140/0 | 510/5:15 | 130/0 | 300/1:54 |

From the above data it is possible to select combinations of amphoterics and other materials which will maintain stable foams with good height at pH11 and will also collapse at pH less than 4. The hardness and salinity of the water should also be considered, but the hardness may be controlled through the use of a calcium chelating agent such as EDTA, and brackish waters may require higher concentration of the foamers. As may be inferred from Table VI, I prefer compositions having approximately equimolar ratios of amphoterics to anionics (for generation of foam at high pH), more particularly in combination with small amounts (about 1% to about 3% of the total content) of fatty acids or their salts to aid in defoaming at low pH's.

We claim:

1. Method of removing particulates from a wellbore comprising injecting into the wellbore a gas and an aqueous solution comprising an amphoteric foaming agent and an anionic surfactant, said solution having a pH of at least about 9.5, thereby forming a foam which lifts particulates to the top of the wellbore, reducing the pH of said foam containing particulates at the top of the wellbore to below about 4, thereby causing the foam to collapse to form an aqueous suspension, and separating particulates therefrom to form a reformed aqueous solution.

2. Method of claim 1 followed by adjusting the pH of said reformed aqueous solution to at least about 9.5.

3. Method of claim 2 wherein portions of said amphoteric foaming agent and said anionic surfactant are removed from said aqueous suspension at the time the particulates are separated therefrom, and including the step of replenishing the amphoteric foaming agent and anionic surfactant so removed by addition of more of at least one thereof.

4. Method of claim 1 wherein said aqueous solution includes a small amount of a fatty acid or salt thereof.

5. Method of claim 1 wherein the amphoteric foaming agent is an imidazoline derivative.

6. Method of claim 1 wherein the amphoteric foaming agent is a betaine.

7. Method of claim 1 wherein the amphoteric foaming agent is an amine oxide foaming agent.

8. Method of claim 2 followed by repeating the steps of claim 1, using said reformed aqueous solution.

9. Method of claim 8 followed by a repetition of the steps of claim 8.

10. Method of claim 8 followed by repeating the steps of claim 2.

11. Method of claim 1 wherein the pH of said solution is reduced by adding sulfuric acid.

12. Method of claim 3 wherein said anionic surfactant and said amphoteric foaming agent are present in said solution at a molar ratio of about 0.6 to 1 to about 1.4 to 1.

13. Method of claim 1 wherein said anionic surfactant and said amphoteric foaming agent are present in said solution at a molar ratio of about 0.6 to 1 to about 1.4 to 1 and at a combined concentration of about 0.2% to about 2.0% by weight.

14. Method of claim 1 wherein said anionic surfactant and said amphoteric foaming agent are present in said aqueous solution in a molar ratio of about 0.9:1 to about 1.1 to 1.

15. Method of claim 3 followed by a repetition of the steps of claim 1 using said reformed aqueous solution.

16. Method of claim 15 followed by repeating the steps of claim 15.

17. Method of removing cuttings from a wellbore comprising injecting into the wellbore gas and an aqueous solution comprising a cationic surfactant and an amphoteric surfactant and having a pH lower than about 4, thereby forming a foam which lifts particulates to the top of said wellbore, treating said foam containing particulates at the top of said wellbore to increase the pH thereof to above about 9.5, thereby causing the foam to collapse and form an aqueous suspension, and separating particulates therefrom to form a reformed aqueous suspension.

18. Method of claim 17 followed by the steps of reducing the pH of said reformed aqueous solution to lower than about 4, and returning said reformed aqueous solution to said wellbore for use as a foaming agent.

19. Process for foam drilling of a wellbore comprising circulating in said wellbore a solution which will form a stable foam at one pH and collapse said foam at another pH, and regulating the pH therein to alternately (1) create foam for carrying particulates and (2) collapse said foam for separating particulates therefrom.

20. Process of claim 19 wherein the pH during foam creation is at least 9.5.

21. Process of claim 19 wherein the pH during foam creation is 4 or lower.

22. Process of claim 19 wherein said solution includes an amphoteric foaming agent.

* * * * *